United States Patent [19]

Lundin

[11] Patent Number: 4,467,173
[45] Date of Patent: Aug. 21, 1984

[54] WELDING HEAD FOR NARROW GAP WELDING

[75] Inventor: Börje R. Lundin, Laxå, Sweden

[73] Assignee: ESAB AB, Göteborg, Sweden

[21] Appl. No.: 357,301

[22] Filed: Mar. 11, 1982

[30] Foreign Application Priority Data

Mar. 17, 1981 [SE] Sweden .................................. 8101675

[51] Int. Cl.³ .......................................... B23K 9/225
[52] U.S. Cl. .............................. 219/125.12; 219/136; 219/137.2; 464/86
[58] Field of Search ................. 219/137.2, 125.12, 136, 219/137 R; 464/86

[56] References Cited

U.S. PATENT DOCUMENTS

| | | | |
|---|---|---|---|
| 1,956,406 | 4/1934 | Vars | 219/125.12 |
| 3,019,622 | 2/1962 | Fermier | 464/86 |
| 3,482,076 | 12/1969 | Barger et al. | 219/126 |
| 3,963,895 | 6/1976 | Hennion | 219/125.12 |
| 3,992,603 | 11/1976 | Reynolds | 219/136 |

FOREIGN PATENT DOCUMENTS 1205208 9/1970 United Kingdom .
2038685 7/1980 United Kingdom .

Primary Examiner—Roy N. Envall, Jr.
Assistant Examiner—Alfred S. Keve
Attorney, Agent, or Firm—Trexler, Bushnell & Wolters, Ltd.

[57] ABSTRACT

A welding head for narrow gap welding is provided with a flat contact nozzle which is pivotable laterally with respect to the longitudinal extent of the gap by being journaled in a similarly flat nozzle holder by means of a shaft which is substantially parallel to the longitudinal extent of the gap and is fully insertable in the gap together with the contact nozzle and at least that part of the nozzle holder which carries the shaft. A drive shaft disposed in the nozzle holder at right angles to the shaft cooperates with the contact nozzle by means of a joint for converting a rotary movement generated by a pendulum device into a corresponding pivotal movement of the contact nozzle about its shaft.

6 Claims, 5 Drawing Figures 4,467,173

WELDING HEAD FOR NARROW GAP WELDING

BACKGROUND OF THE INVENTION

The present invention relates to an improvement in a welding head for narrow gap welding with a contact nozzle for a welding electrode, the contact nozzle being laterally pivotal by operating means with respect to the longitudinal extent of the gap, about a shaft disposed in a nozzle holder.

It is known, in multi-pass welding of relatively narrow and deep gaps between two workpiece parts, to use a filler wire holder which is pivotal about an axis located outside the gap in such a manner that the gap can be filled with two or more welding passes beside and overlapping one another.

For welding together two substantially cylindrical workpiece parts along a narrow gap in a plane substantially at right angles to the axis of the cylinder, it is also known to utilize an elongate filler wire holder which extends into the gap substantially perpendicular to the direction of feed of the filler wire. The filler wire holder is, here, arranged for pivoting on its own longitudinal axis in that it is mounted in pivot bearings located outside the gap.

This latter welding apparatus allows for a relatively large angular movement of the filler wire between the two extreme positions on one and the other side of the gap. The thus obtained, relatively great inclination of the filler wire has resulted in an improved welding quality; this in comparison with the quality of welding using a smaller filler wire inclination. One disadvantage inherent, however, in this apparatus is that the filler wire holder, because of its length, is not capable of holding the filler wire with sufficient stability, for which reason it is not possible to direct the path of travel of the filler wire as accurately as might be desired.

SUMMARY OF THE INVENTION

The object of the present invention is to realize an improvement of the type disclosed by way of introduction, the improvement consisting of an apparatus which makes it possible to guide, with requisite accuracy and stability, the pivoting of the filler wire between the extreme positions in the gap being welded while retaining the relatively great angle of inclination of the filler wire in these extreme positions.

According to the invention, this is accomplished by means of a narrow gap welding apparatus comprising a welding head having a contact nozzle for a welding electrode, a nozzle holder in which said contact nozzle is laterally pivotal with respect to the longitudinal extent of the gap, about a shaft disposed in said holder, and operating means connected to said nozzle to effect pivotal movement thereof, said pivotal contact nozzle and at least the holder part carrying said shaft being fully insertable into the gap.

BRIEF DESCRIPTION OF THE DRAWINGS

One example of the welding apparatus according to the invention will be described in greater detail below with reference to the accompanying drawings wherein.

DESCRIPTION OF THE PREFERRED EMBODIMENT

Figure 1:
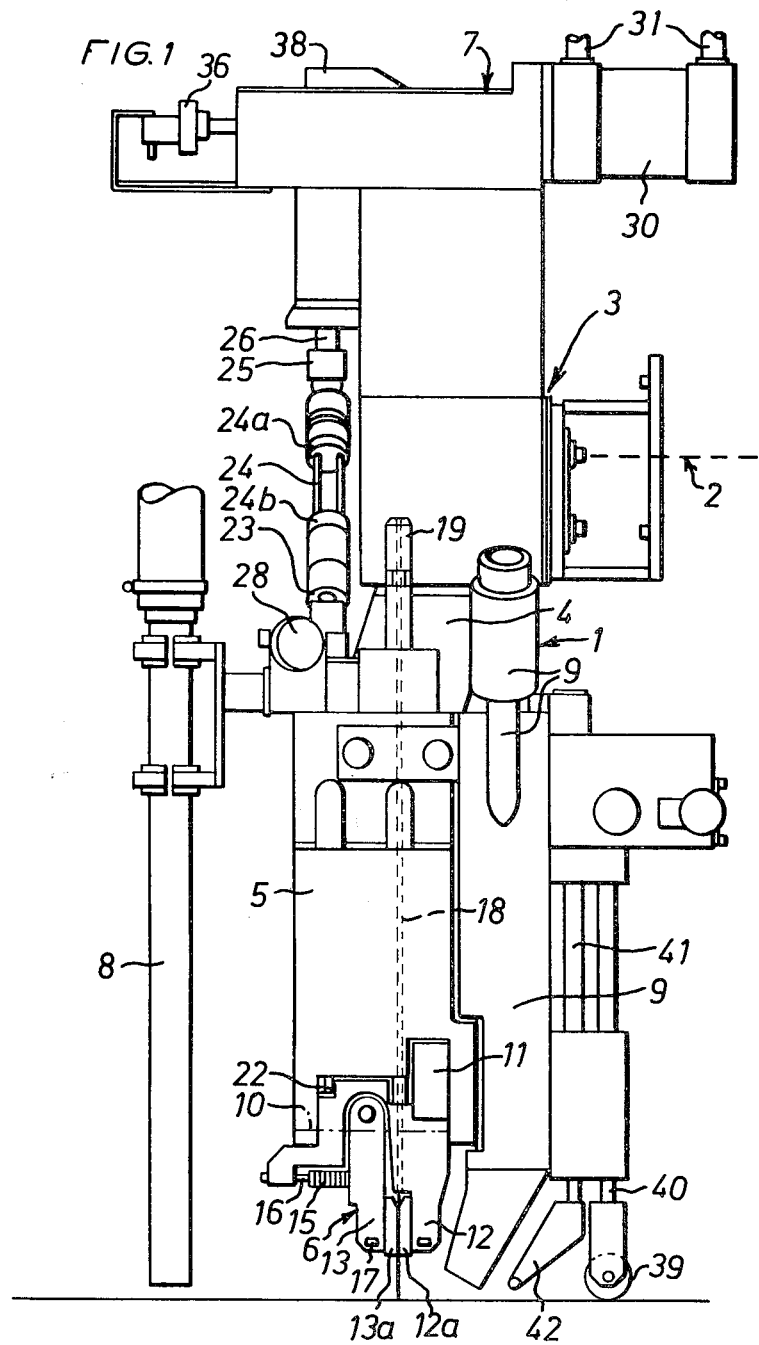
FIG. 1 is a schematic side elevation of a welding head designed in accordance with the present invention.

Referring to the drawings, a welding head 1 is intended to be mounted on a frame by means of crossing slides such that the welding head 1 is movable transversely and vertically in relation to a contemplated welding joint. The welding head also is movable about an axis 2 at right angles both to said transverse direction and to said vertical direction. The welding head 1 has a body 3 supporting a wire straightening mechanism (not shown) for the welding filler, as well as a welding flux container (not shown). A holder 5 for a contact nozzle 6 is carried on the body 3 by means of a bracket 4. The body also carries an operating member 7 in the form of a pendulum device for the contact nozzle 6, and further a pipe 9 built integrally with the nozzle holder 5 and connected to the flux container (not shown) for supply of flux to the welding point, and a pipe 8 for sucking flux from the welding joint.

Figure 2:
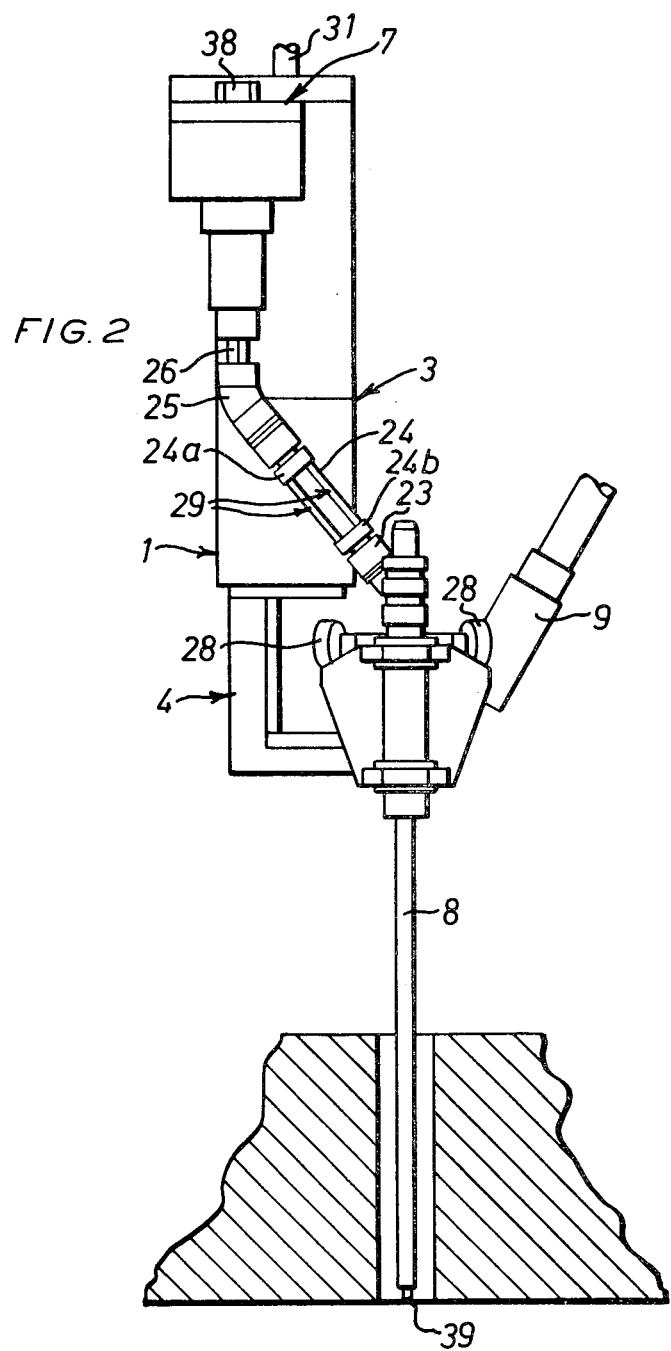
FIGS. 2 and 3 are a front elevation and a plan elevation, respectively, of the welding head of FIG. 1.
Figure 3:
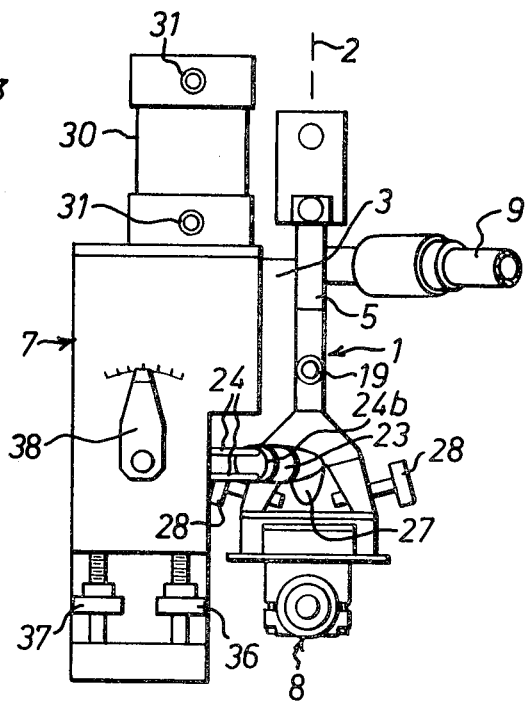

The holder 5 is of flat configuration in order to enable it to be passed into a narrow gap (FIG. 2). In the narrow gap, it may easily happen that the holder 5 and the contact nozzle 6, on being manaeuvred in the gap, will come into contact with the gap sides. The holder and the contact nozzle are, therefore, provided with an electrically insulating layer in order to prevent short-circuiting between the two live parts and the workpiece. The layer consists preferably of a multilayer glass-fiber sheet which is fixed to the substrate by means of an inorganic ceramic adhesive. Such an adhesive contains for example silicates, and the insulating layer is heat and wear resistant. The contact nozzle 6 is pivotally carried by the holder 5 by means of a shaft 10 which is journaled in the holder 5 and extends substantially horizontally in the plane of the holder 5. A flexible conductor 11 composed of several leaf-shaped conductor runs is connected both to the holder 5 and the contact nozzle 6 for conducting the current between these two parts. The contact nozzle 6 has two contact jaws 12, 13 provided with contact pieces 12a, 13a. The contact jaw 12 is carried on the shaft 10, while the contact jaw 13 is pivotally disposed with respect to the jaw 12 by means of a shaft 14 which extends at right angles to the plane of the nozzle holder 5. For urging the contact jaws 12, 13 against a filler wire located therebetween, a system of cup springs 15 is disposed on a pin 16 anchored in the contact jaw 12 and, more precisely, between an abutment on this pin and a surface of the contact jaw 13. The contact jaws 12 and 13 are provided with removable lugs or wiper contacts 17 of electrically insulating and, suitably, heat-resistant material. These wiper contacts 17 protrude from the plane of the contact nozzle 6 and serve as spacer means between the contact nozzle 6 and the sides of the gap, or as collision protection against unforeseen obstacles in the gap or in the event of errors of adjustments of the welding head in relation to the gap.

From the nip between the contact jaws 12, 13, there extends a bore 18 up through the contact nozzle 6 and also through the nozzle holder 5 to discharge in a sleeve 19 mounted on the nozzle holder 5. Filler wire is intended to be passed from a wire supply apparatus through a wire straightening mechanism (not shown) mounted on the body 3 and then into the sleeve 19 and through the bore 18 in order to be held between the contact jaws 12, 13.

A second bore 20 extends through the nozzle holder 5 parallel with the bore 18. A drive shaft 21 is accommodated in this second bore 20, the shaft being, at its lower end projecting from the bore 20, pivotally coupled to the nozzle 6 by means of a joint 22 which consists of a pivot ball on the drive shaft 21 and a pivot socket on the nozzle 6. The upper end of the drive shaft 21 projecting from the nozzle holder 5, is connected, by means of a pivotal shaft coupling 23, a torsionally elastic shaft 24 and a second pivotal shaft coupling 25, to a shaft 26 departing from the pendulum device 7. A cam 27 is also fixedly mounted on the upper end of the drive shaft 22 for cooperation with two setscrews 28 serving as limit stops. The torsionally elastic shaft 24 consists of two stub shafts 24a, 24b which are connected by spring steel wires 29 disposed in parallel with the shaft axis and in symmetry with the shaft center. The stub shafts 24a, 24b are connected to the drive shaft 21 by the intermediary of the shaft coupling 23 and to the pendulum device 7 serving as an operating member by the intermediary of the shaft coupling 25.

Figure 5:
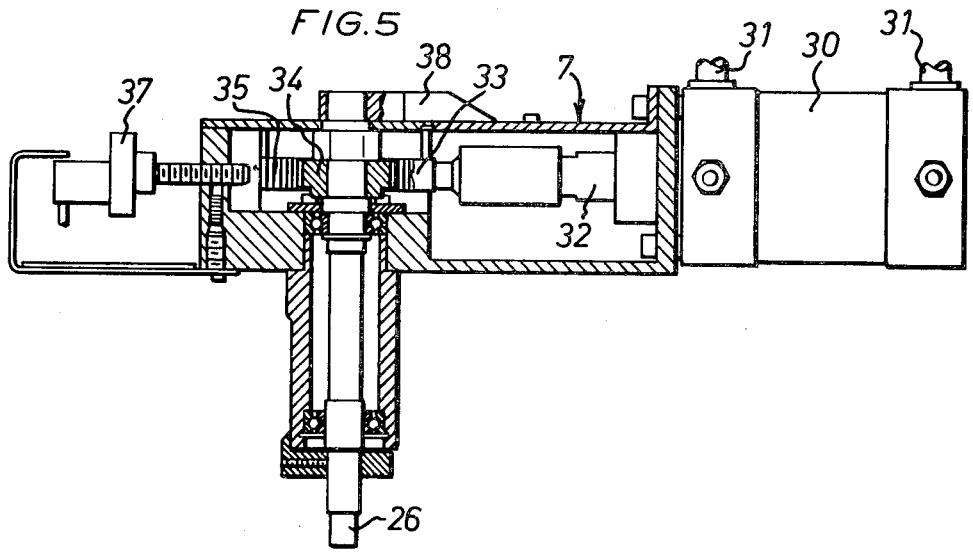
FIG. 5 is a longitudinal sectional view of a pendulum device included in the welding apparatus according to the present invention.
Figure 4:
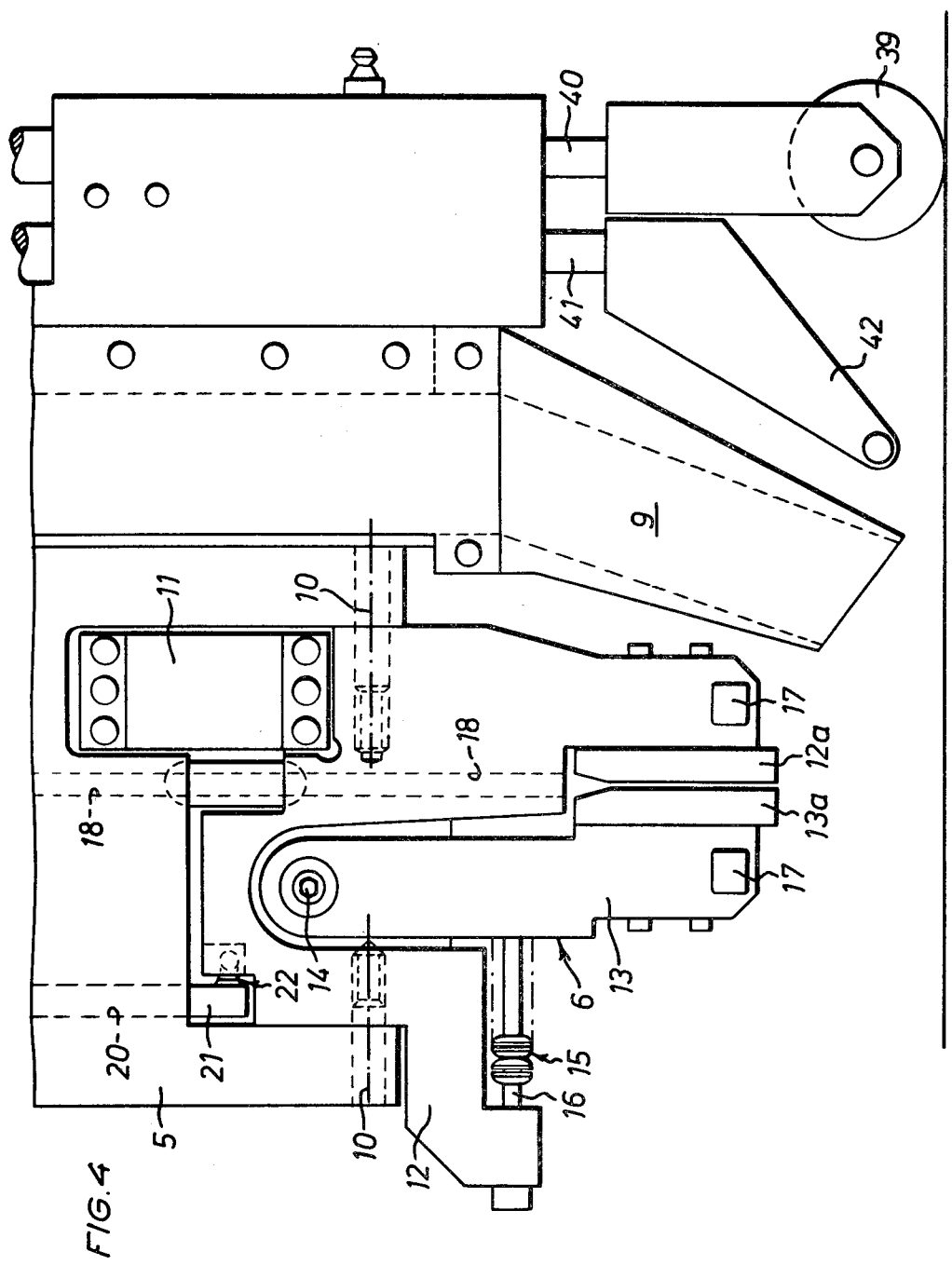
FIG. 4 shows, on a larger scale, a detail of the head of FIG. 1.

The pendulum device 7 comprises a double-acting hydraulic cylinder 30 with pipe connections 31 to equipment (not shown) for driving the piston of the hydraulic cylinder 30 between the two end positions thereof. The piston rod 32 of the hydraulic cylinder 30 cooperates with a rotary driver in the form of a rack 33 and a pinion 34 in mesh therewith. In FIG. 5 that part of the rack 33 which lies in front of the pinion 34 has been broken away. The pinion 34 is fixedly mounted on the shaft 26 departing from the pendulum device 7 and is also in mesh with a rack 35 disposed in diametric opposition to the rack 33. Upon displacement of the piston rod 32, the racks 33, 35 will therefore move in opposite directions. These movements are limited by two limit stops 36, 37. Upon retraction of the piston rod 32—in FIG. 5 to the right—the rack 35 will move in the opposite direction—to the left—until its movement is stopped by the limit stop 37. During forward movement of the piston rod 32, the rack 33 fixedly connected with the piston rod 32 will move to the left until it strikes the limit stop 36 (not shown in FIG. 5). The path of rack travel corresponds to a given angle of rotation of the shaft 26, the size of said angle being adjustable by means of the limit stops 36, 37 which are in the form of setscrews. For indicating the angular position of the shaft 26, a scale is marked on the upper side of the pendulum device 7 and an indicator 38 is fixedly mounted on the upper end of the shaft 26.

When the welding head is inserted into a narrow gap having a depth, on commencement of the welding operation, of at least 50 mm and a width of at most 25 mm, the pivotal contact nozzle 6, and at least that part of the nozzle holder 5 which carries the shaft 10 formed of two stub shafts, will be completely inserted into the gap. The position of the welding head in relation to the bottom and sides of the gap will be sensed by means of a disc 39 which is mounted on a spring-biased vertical rod 40 which, in its turn, is connected to an electric transducer (not shown). For sensing the lateral position of the welding head in the gap, use is made of a vane 42 mounted on a similarly vertical rod 41.

For shifting the contact nozzle 6 from one side of a narrow gap to its other side, the hydraulic cylinder 30 is activated, the piston rod 32 and the racks 33, 35 being shifted a distance determined by the limit stops 36, 37 during rotation of the pinion 34 and, therewith, the shaft 26 of the pendulum device 7. This rotary movement of the shaft 26 is transmitted by the intermediary of the torsionally elastic shaft 24 to the drive shaft 21, whereby the rotary movement will be converted, by the intermediary of the joint 22, into a pivotal movement of the contact nozzle 6. The size of the pivotal movement of the contact nozzle 6 is determined by the adjustment of the setscrews 28 with respect to the cam 27 mounted on the drive shaft 21, the torsionally elastic shaft 24 absorbing the difference between a larger angle of rotation of the shaft 26 and the angle of rotation determined by the setscrews 28 for the drive shaft 21 and thereby the pivotal movement of the contact nozzle 6.

The pendulum movement of the contact nozzle may also take place without the assistance of the setscrews 28, in that the contact nozzle 6 is pivoted by the pendulum device with such force that the wiper contact 17 on the contact nozzle engages the side of the gap. To this end, the limit stops 36, 37 are set such that the angle of rotation of the shaft 26 will be greater than the angle of rotation of the shaft 21, which latter angle is determined by the width of the gap, and the contact nozzle 6 will be urged, under the action of the torsionally elastic shaft 24, with its wiper contact 17 against the side of the gap.

The apparatus according to the present invention ensures a very stable and accurate guiding of the contact nozzle, whereby the narrow gap can be filled in a manner which satisfies all demands on welding quality.

The skilled reader of the specification will perceive possible modifications of the above-described embodiments of the invention without departing from the spirit and scope of the invention as set out in the appended claims.

What I claim and desire to secure by Letters Patent is:

1. A welding head for depositing a weld in a narrow gap formed by opposing walls of two work pieces to be joined and having a longitudinal extent, the gap having a depth of at least 50 mm and a width of at most 25 mm comprising:
   (A) a body;
   (B) a flat-shaped nozzle holder having a guide for a fusible wire electrode, said nozzle holder being rigidly attached to said body;
   (C) a pivotable contact nozzle being laterally pivotable with respect to the longitudinal extent of the gap about a first shaft connecting said contact nozzle to the lower end of said nozzle holder, said pivotable contact nozzle and at least the part of the holder that carries the first shaft being fully insertable into the gap;
   (D) operating means;
   (E) means for connecting the operating means to said contact nozzle, said connecting means including a second shaft disposed in parallel with the plane of the flat-shaped nozzle holder and joint means being adapted to convert a limited turning movement impressed on the second shaft by said operating means into a corresponding pivotal movement of the contact nozzle about said first shaft.

2. A welding head of claim 1, including a third shaft disposed at right angles to the plane of the nozzle wherein the contact is of flat configuration and is provided with two contact jaws one of which is pivotal about said third shaft and which connects the two contact jaws and further including pressure means, wherein said contact jaws are disposed to be urged against one another by said pressure means for applying contact pressure to the welding electrode which is being advanced between contact pieces of the contact jaws.

3. A welding head of claim 1, wherein said nozzle holder and said contact nozzle are provided with an electrically insulating layer consisting of at least one layer of glass fiber sheet which is retained by inorganic, ceramic adhesive.

4. A welding head of claim 1, and further including limit stops and a fourth shaft of the operating means, wherein the extreme position of the limited turning movement of said second shaft is adjustable by means of said limit stops and including a torsionally elastic shaft connected between said second shaft and said fourth shaft, said torsionally elastic shaft absorbing the differences between the angle of rotation of said fourth shaft and the angle of rotation determined by said limit stops for the second shaft if the angle of rotation of said fourth shaft is larger than the angle of rotation of said second shaft.

5. A welding head of claim 4, wherein said torsionally elastic shaft comprises two stub shafts which are connected by spring steel wires disposed in parallel with the shaft axis and in symmetry with the shaft center, the free ends of both stub shafts being connected to said second shaft and said third shaft, respectively.

6. A welding head of claim 1, wherein said joint means consists of a pivot ball and a pivot socket, of which the one is disposed on said second shaft and the other on said contact nozzle.

* * * * *